United States Patent
Rosson et al.

(10) Patent No.: US 8,164,208 B2
(45) Date of Patent: Apr. 24, 2012

(54) SYSTEMS INVOLVING MULTI-SPOOL GENERATORS AND VARIABLE SPEED ELECTRICAL GENERATORS

(75) Inventors: Randy Scott Rosson, Simpsonville, SC (US); Kevin Wood Wilkes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/424,025

(22) Filed: Apr. 15, 2009

(65) Prior Publication Data

US 2010/0264655 A1 Oct. 21, 2010

(51) Int. Cl.
*F01D 15/10* (2006.01)
*F02C 6/00* (2006.01)
(52) U.S. Cl. .......................................... 290/52; 290/4 A
(58) Field of Classification Search ............... 290/52, 290/4 A, 4 R, 40 R, 40 B
See application file for complete search history.

(56) References Cited

U.S. PATENT DOCUMENTS

| | | | | |
|---|---|---|---|---|
| 4,498,289 A * | 2/1985 | Osgerby | ............... | 60/39.17 |
| 4,785,622 A * | 11/1988 | Plumley et al. | ............ | 60/39.182 |
| 4,812,730 A * | 3/1989 | Nakagawa et al. | ........... | 318/732 |
| 4,896,499 A * | 1/1990 | Rice | ........................ | 60/39.182 |
| 5,313,782 A * | 5/1994 | Frutschi et al. | ............ | 60/39.182 |
| 5,694,026 A | 12/1997 | Blanchet | | |
| 6,107,693 A * | 8/2000 | Mongia et al. | ................. | 290/52 |
| 6,161,385 A * | 12/2000 | Rebhan et al. | ................. | 60/646 |
| 2008/0087001 A1 * | 4/2008 | Lilley et al. | ................. | 60/39.15 |

OTHER PUBLICATIONS

"mechanically." Collins English Dictionary—Complete & Unabridged 10th Edition. HarperCollins Publishers. Nov. 9, 2011. <Dictionary.com http://dictionary.reference.com/browse/mechanically>.*
"driven." Dictionary.com Unabridged. Random House, Inc. Nov. 9, 2011. <Dictionary.com http://dictionary.reference.com/browse/driven>.*

* cited by examiner

*Primary Examiner* — Quyen Leung
*Assistant Examiner* — Michael Andrews
(74) *Attorney, Agent, or Firm* — Cantor Colburn LLP

(57) ABSTRACT

A system comprises a turbine engine having a first spool connected to a compressor portion, a power turbine spool, a first generator connected to the power turbine spool, and a second generator connected to the first spool.

20 Claims, 8 Drawing Sheets

SYSTEMS INVOLVING MULTI-SPOOL GENERATORS AND VARIABLE SPEED ELECTRICAL GENERATORS

BACKGROUND OF THE INVENTION

The subject matter disclosed herein relates to power generation particularly gas turbine power generation.

Single spool configurations of generators use a high pressure turbine that is connected to a compressor and a synchronous speed generator. Disadvantages of single spool configurations may include a reduction of the power capacity of the gas turbine when ambient temperature increases or when the power grid frequency decreases.

Two spool gas turbine generators typically use a high pressure turbine that is connected to a compressor and a low pressure turbine that is connected to a generator. A disadvantage of using a two spool generator configuration is that there is a slower transient response when desired output of the generator changes. In large systems, a large power turbine spool may be difficult to design and fabricate.

BRIEF DESCRIPTION OF THE INVENTION

According to one aspect of the invention, a system comprises a turbine engine having a first spool connected to a compressor portion, a power turbine spool, a first generator connected to the power turbine spool, and a second generator connected to the first spool.

According to another aspect of the invention, a system comprises a turbine engine having a first spool connected to a compressor portion, a power turbine spool operative to be driven by exhaust from the turbine engine, a first generator connected to the power turbine spool, and a variable speed generator connected to the first spool, operative to be driven by the first spool.

According to yet another aspect of the invention, a method for operating a system, the method comprises rotating a high pressure spool of a gas turbine engine with a variable speed generator, initiating combustion in a combustor of the gas turbine engine, driving the variable speed generator with the high pressure gas turbine engine and driving a low pressure spool connected to a second generator with exhaust from the gas turbine engine.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Previous systems used a synchronous speed generator that was connected to a high pressure spool via a shaft (a single spool system), or was connected to a power turbine that rotated by the exhaust emitted from the high pressure spool (a multi-spool system). Advantages of using a single spool system include faster responses to transient conditions in the system, and the synchronous speed generator may be used to start the gas turbine engine. Disadvantages may include a reduction in output capacity when ambient temperatures increase, and when the grid frequency decreases. Advantages of using a typical multi-spool system include less reduction in output capacity when ambient temperatures increase, and better response to changes in grid frequencies. Disadvantages of typical multi-spool systems may include the use of a starting sub-system that increases the complexity and cost of the system, and the cost of designing and fabricating large power turbines. An additional disadvantage of a typical multi-spool generator configuration may be that the high pressure spool design is usually suitable for multi-spool applications. A typical single spool gas turbine design includes a three stage gas turbine. The three turbine stages are typically equally loaded such that one and a half of the stages power the turbine compressor, and the remaining one and a half stages outputs power to the generator. The exemplary embodiments of multi-spool systems described below include the use of a variable speed generator connected to a high pressure spool, and a second generator (synchronous or variable speed) connected to a power turbine that increase the effectiveness and efficiency of the systems. An advantage in using a variable speed generator in the multi-spool system is that for a three stage gas turbine, one an a half stages may be used to drive the compressor, a stage may be used to drive a first generator, and the remaining half stage may be used to drive a variable speed generator. Therefore, it is practical and cost effective for a single spool configuration and a multi-spool to share very similar turbine stage designs.

Figure 1:
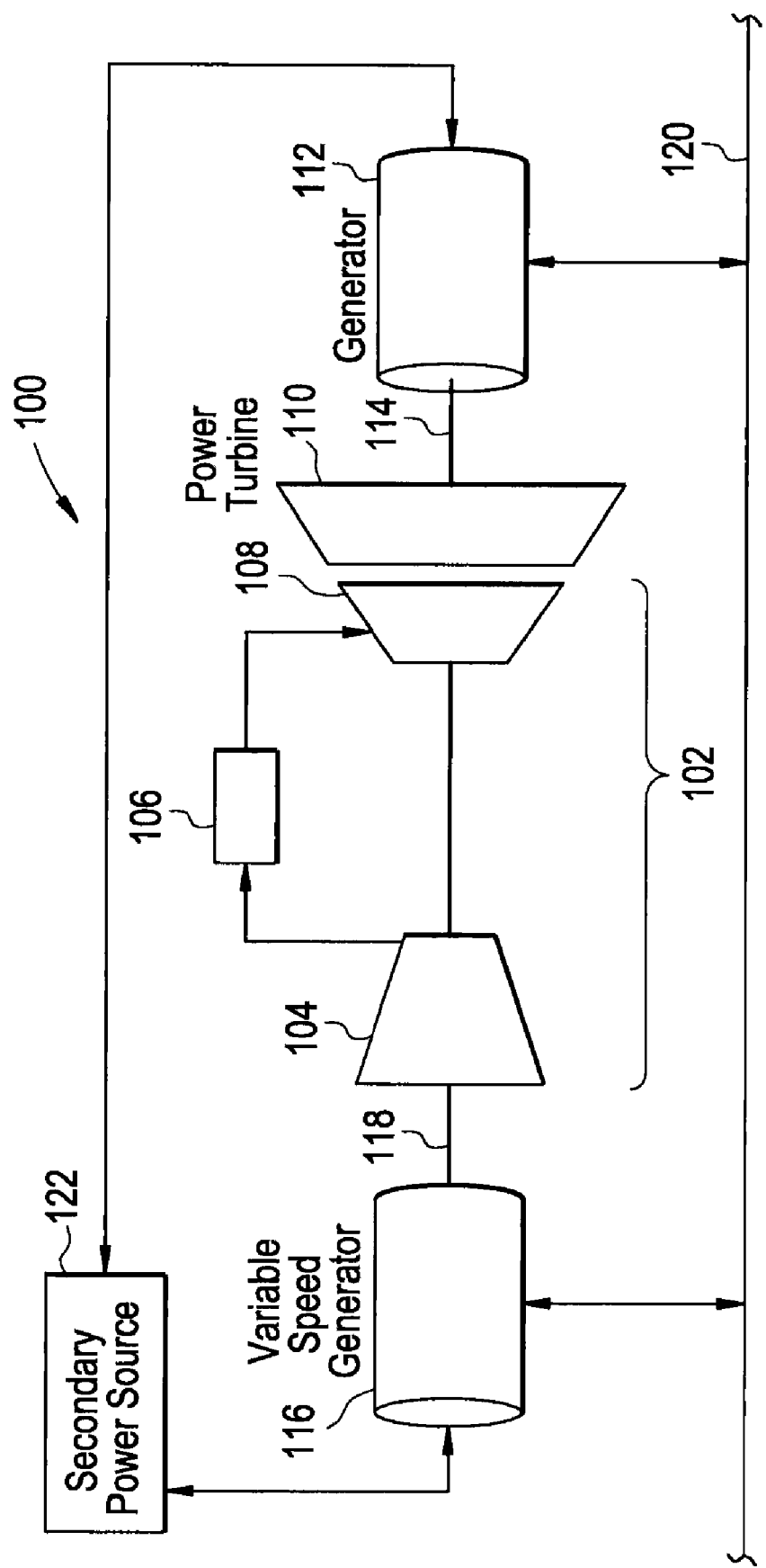
FIG. 1 is an exemplary embodiment of a multi-spool generator system.

FIG. 1 illustrates an exemplary embodiment of a multi-spool generator system 100. The system 100 includes a gas turbine engine 102 having a compressor 104, a combustor 106, and a high pressure turbine (high pressure spool) 108. A power turbine spool (low pressure spool) 110 is connected to a first generator 112 (The first generator 112 may be a synchronous generator or a variable speed generator.) via a first shaft 114. A variable speed generator 116 is connected to the compressor 104 via a second shaft 118. The first generator 112 and the variable speed generator 116 are electrically connected to a grid 120. The variable speed generator 116 and/or the first generator 112 may in some embodiments be electrically connected to a secondary power source 122, such as, for example, a diesel generator or other type of power source appropriate for powering the generators in a gas turbine starting sequence.

In operation, air is compressed by the compressor 104, mixed with fuel, and combusted in the combustor 106. The hot expanding gas in the combustor 106 rotates the high pressure spool. The hot expanding gas passes through the high pressure turbine 108, and rotates the power turbine 110. The rotation of the power turbine 110 turns the first generator 112 via the first shaft 114. The first generator 112 sends power to the grid 120. The rotation of the high pressure spool 108 rotates the second shaft 118, and the connected variable speed generator 116. The variable speed generator 116 may also send power to the grid 120. In a starting sequence, the variable speed generator 116 may be powered by the grid 120 or the secondary power source 122. A detailed exemplary starting sequence is described below.

Figure 2:
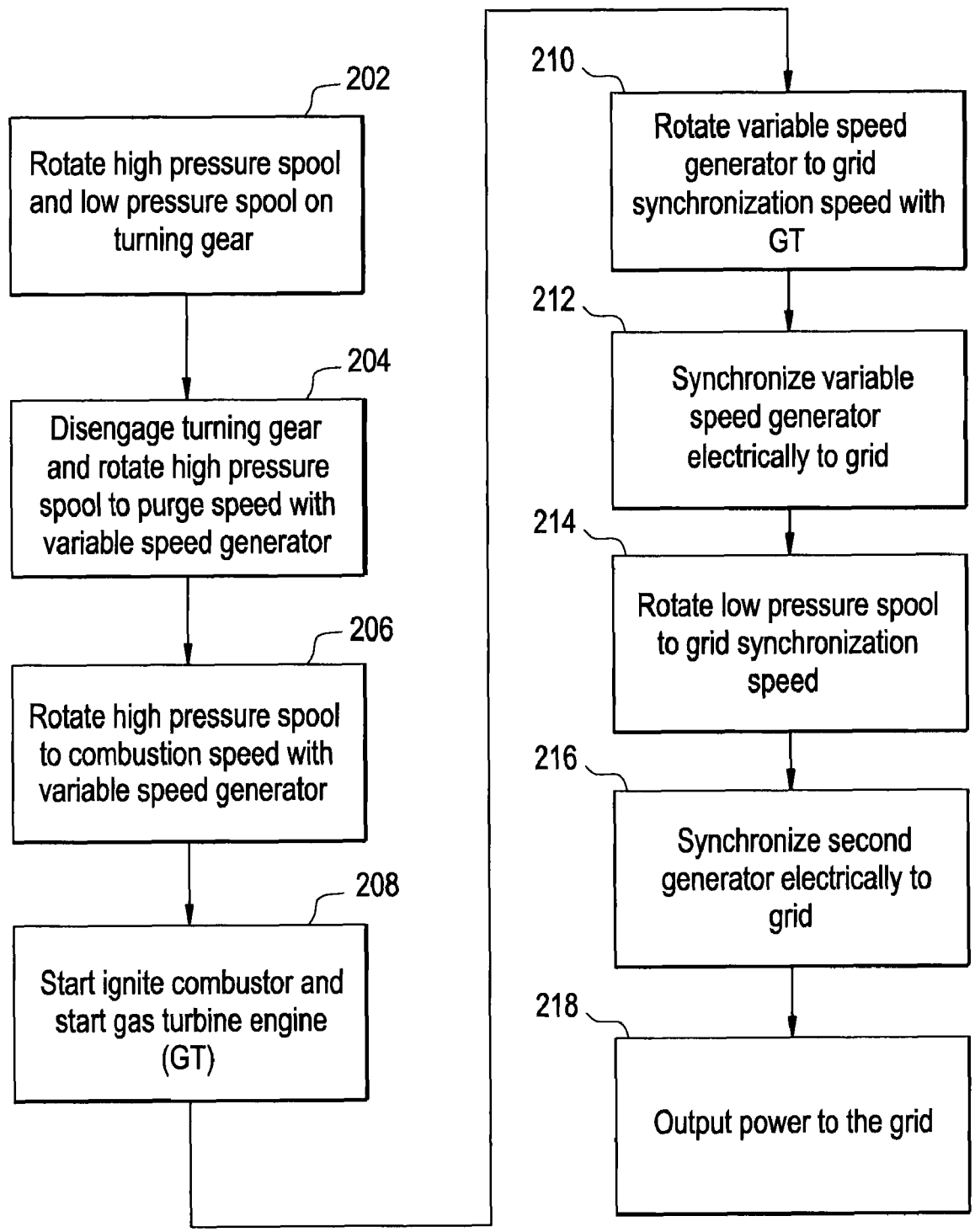
FIG. 2 is a block diagram of an exemplary method for starting the system of FIG. 1.

FIG. 2 illustrates a block diagram of an exemplary method for starting the system 100 (of FIG. 1). Similar methods may be used to start other exemplary embodiments of the systems described below. In block 202, the high pressure spool 108 and the low pressure spool (power turbine) 110 are rotated using, for example, a turning gear. The rotation of the turning gear prepares the system 100 for startup. In block 204, the turning gear is disengaged, and the variable speed generator 116 rotates the high pressure spool to purge speed. The variable speed generator 116 may be powered by the grid 120, or in some embodiments, the secondary power source 122. Once the purge is complete, the variable speed generator 116 rotates the high pressure spool 108 to combustion speed in block 206. In block 208, once combustion speed is reached, the combustor ignites, and the gas turbine engine 208 is started. When the gas turbine engine has run for a defined warm up time, the variable speed generator 116 is rotated to match a grid synchronization speed by the high pressure spool 108 in block 210. In block 212, the variable speed generator 116 is synchronized with the grid 120 to provide power to the grid 120. In block 214, the low pressure spool 110 is rotated with the first generator 112 to grid synchronization speed. The exhaust flow emitted from gas turbine engine 102 powers the low pressure spool 110. Once the first generator 112 has reached the grid synchronization speed, the first generator 112 is synchronized electrically to the grid 120 in block 216. In block 218, power is output to the grid.

Figure 3:
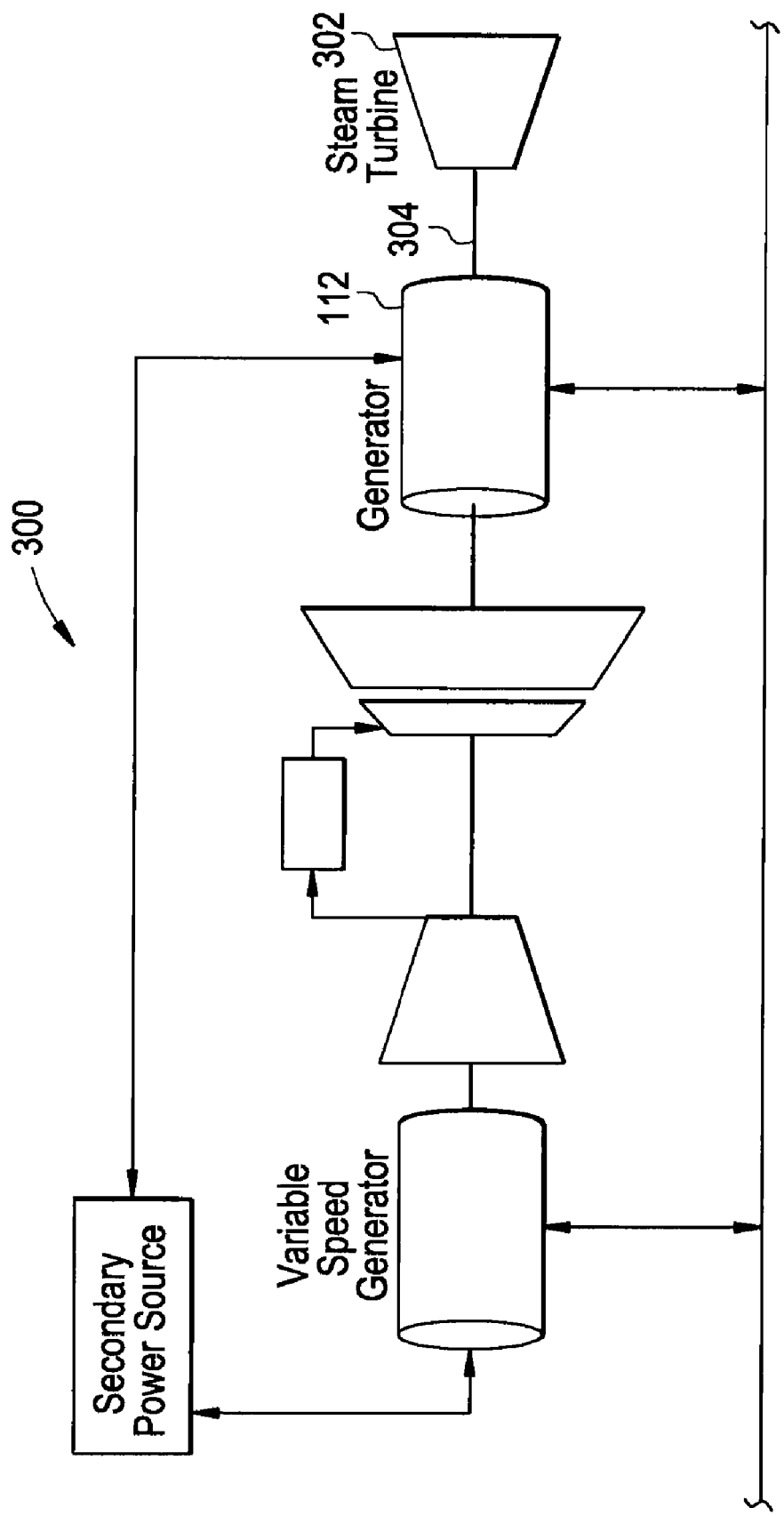
FIG. 3 is an alternate exemplary embodiment of the system of FIG. 1.

FIG. 3 illustrates an alternate exemplary embodiment of the system 100. FIG. 3 includes a system 300 having a steam turbine 302 that may be connected to the first generator 112 via a third shaft 304 to mechanically assist the rotation of the first generator 112.

Figure 4:
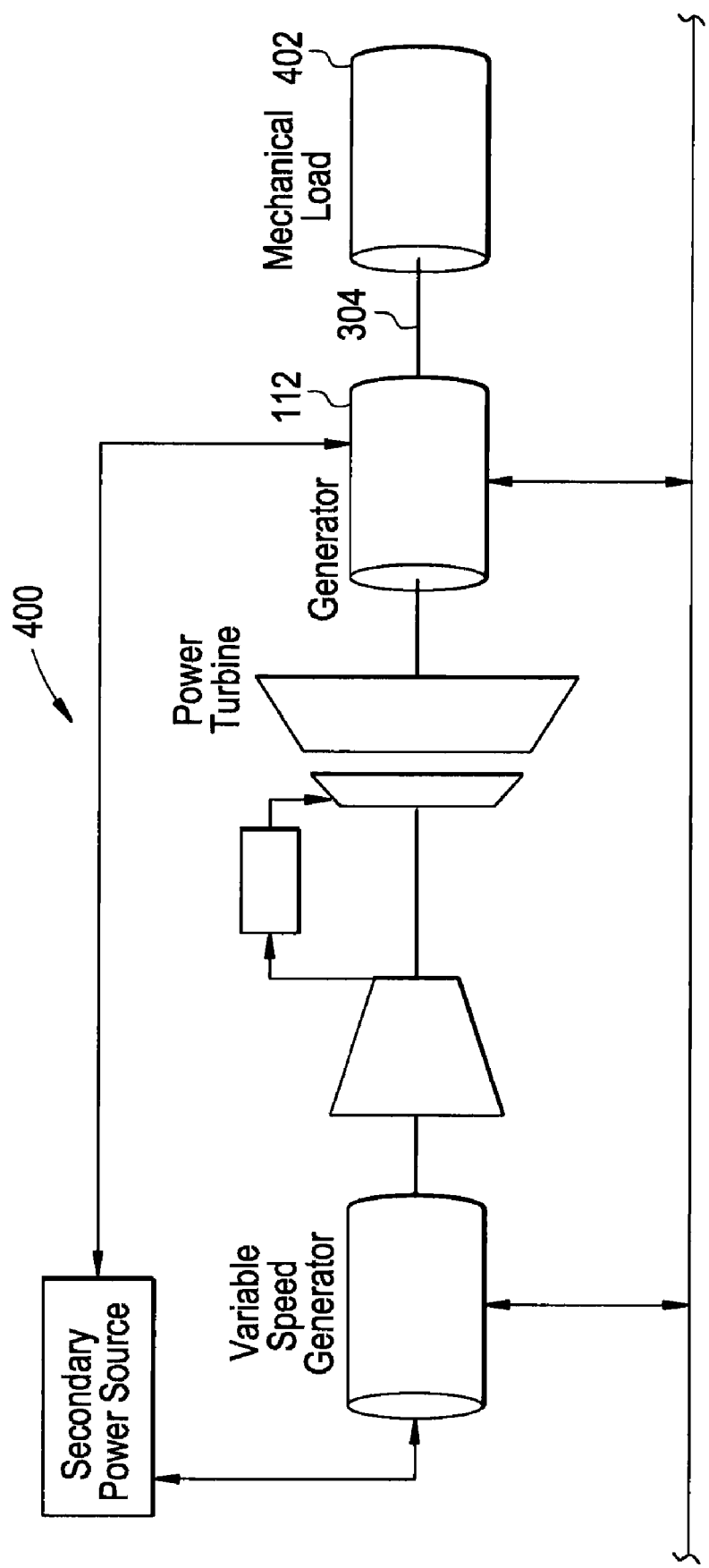
FIG. 4 is another alternate exemplary embodiment of the system of FIG. 1.

FIG. 4 illustrates another alternate exemplary embodiment of the system 100 that is similar to the embodiment illustrated in FIG. 3. The system 400 of FIG. 4 includes an additional mechanical load 402 that is connected to the first generator 112 via the shaft 304.

Figure 5:
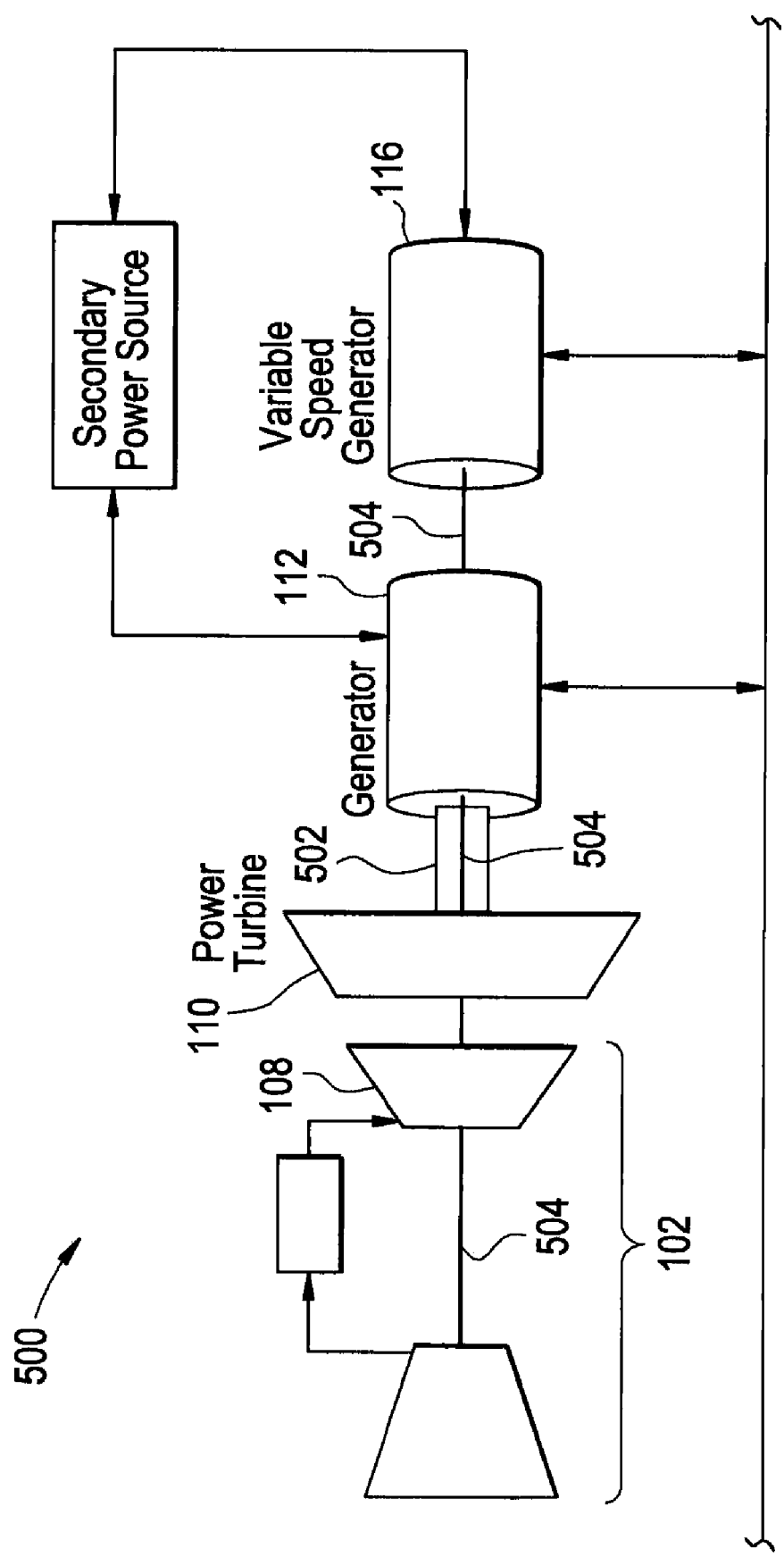
FIG. 5 is another alternate exemplary embodiment of the system of FIG. 1.

FIG. 5 illustrates yet another alternate exemplary embodiment of the system. In this regard, the system 500 includes an outer shaft 502 that connects the first generator 112 to the power turbine 110. The variable speed generator 116 is connected to the high pressure spool 108 of the gas turbine engine 102 via an inner shaft 504 aligned concentrically to, and disposed within, the outer shaft 502.

Figure 6:
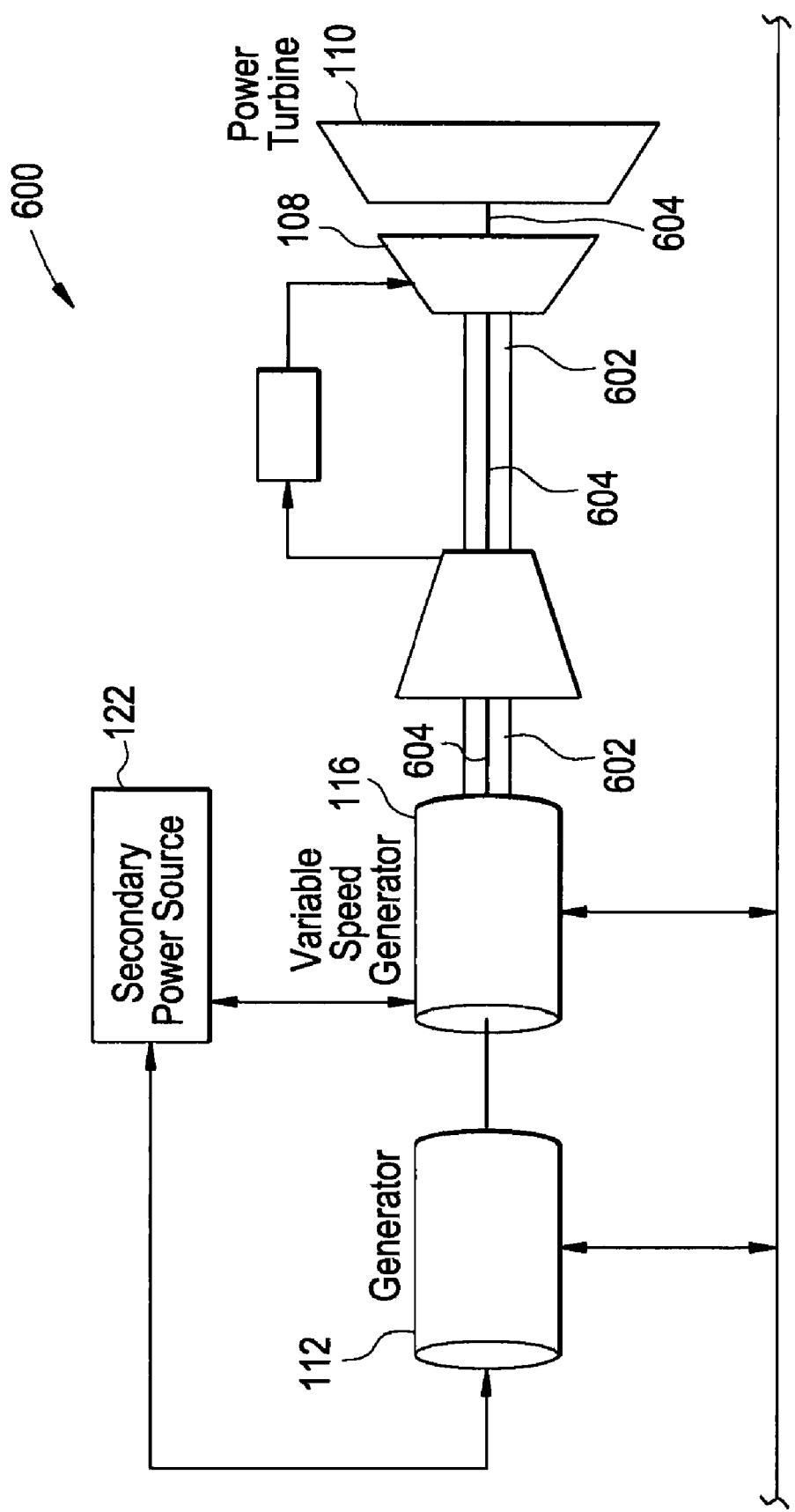
FIG. 6 is another alternate exemplary embodiment of the system of FIG. 1.

FIG. 6 illustrates another alternate exemplary embodiment that is similar to the system 500. In this regard, the system 600 includes an outer shaft 602 that connects the variable speed generator 116 to the high pressure spool 108. The first generator 112 is connected to the power turbine 110 via an inner shaft 604 aligned concentrically to, and disposed within, the outer shaft 602.

Figure 7:
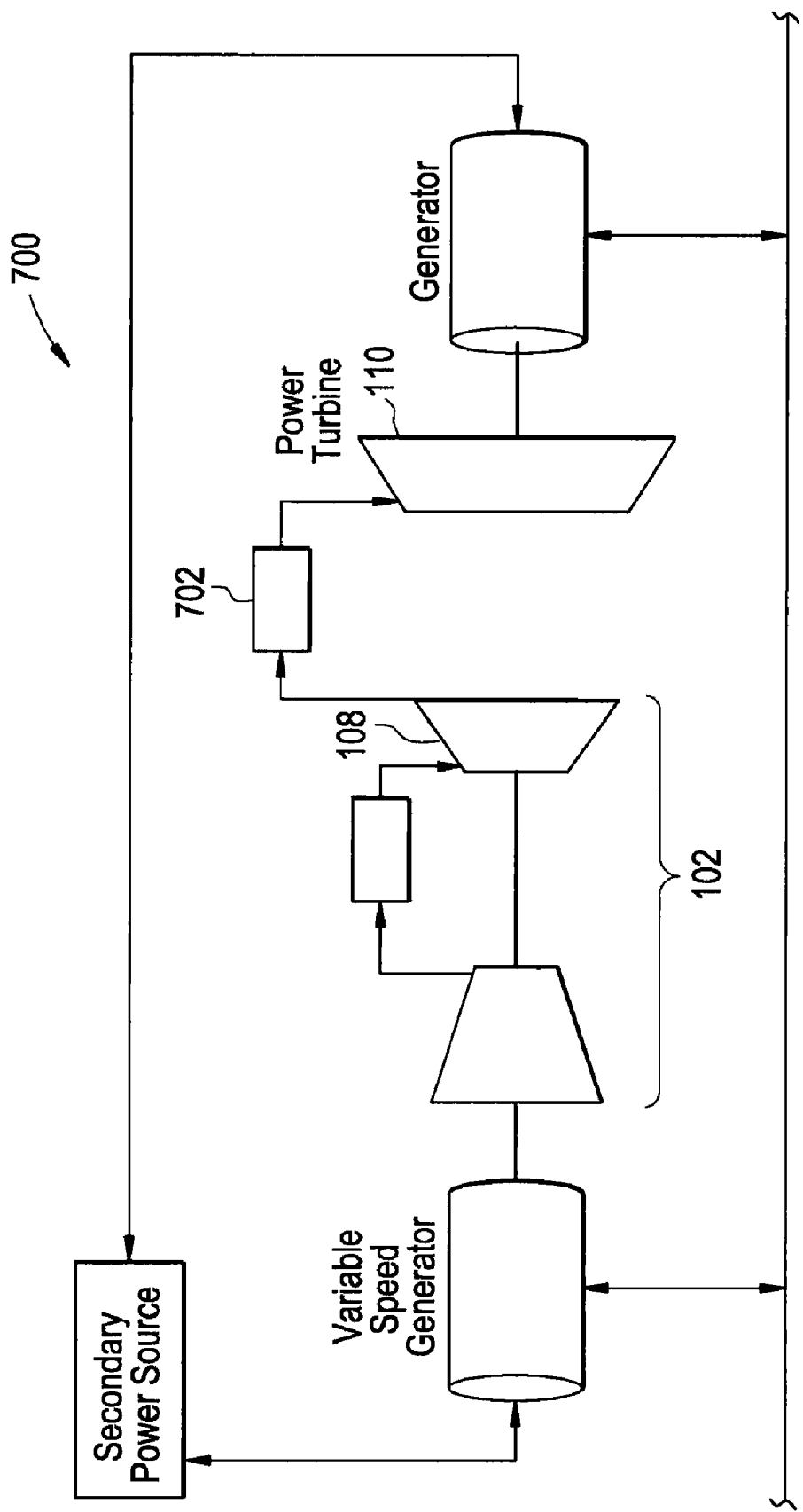
FIG. 7 is another alternate exemplary embodiment of the system of FIG. 1.

FIG. 7 illustrates an alternate exemplary embodiment of the system 100 that may be combined with any of the embodiments described above. In this regard, the system 700 includes a second combustor 702 that receives the output exhaust from the gas turbine engine 102 and further heats the exhaust using combustion. The heated exhaust is output by the second combustor 702 to the power turbine 110.

Figure 8:
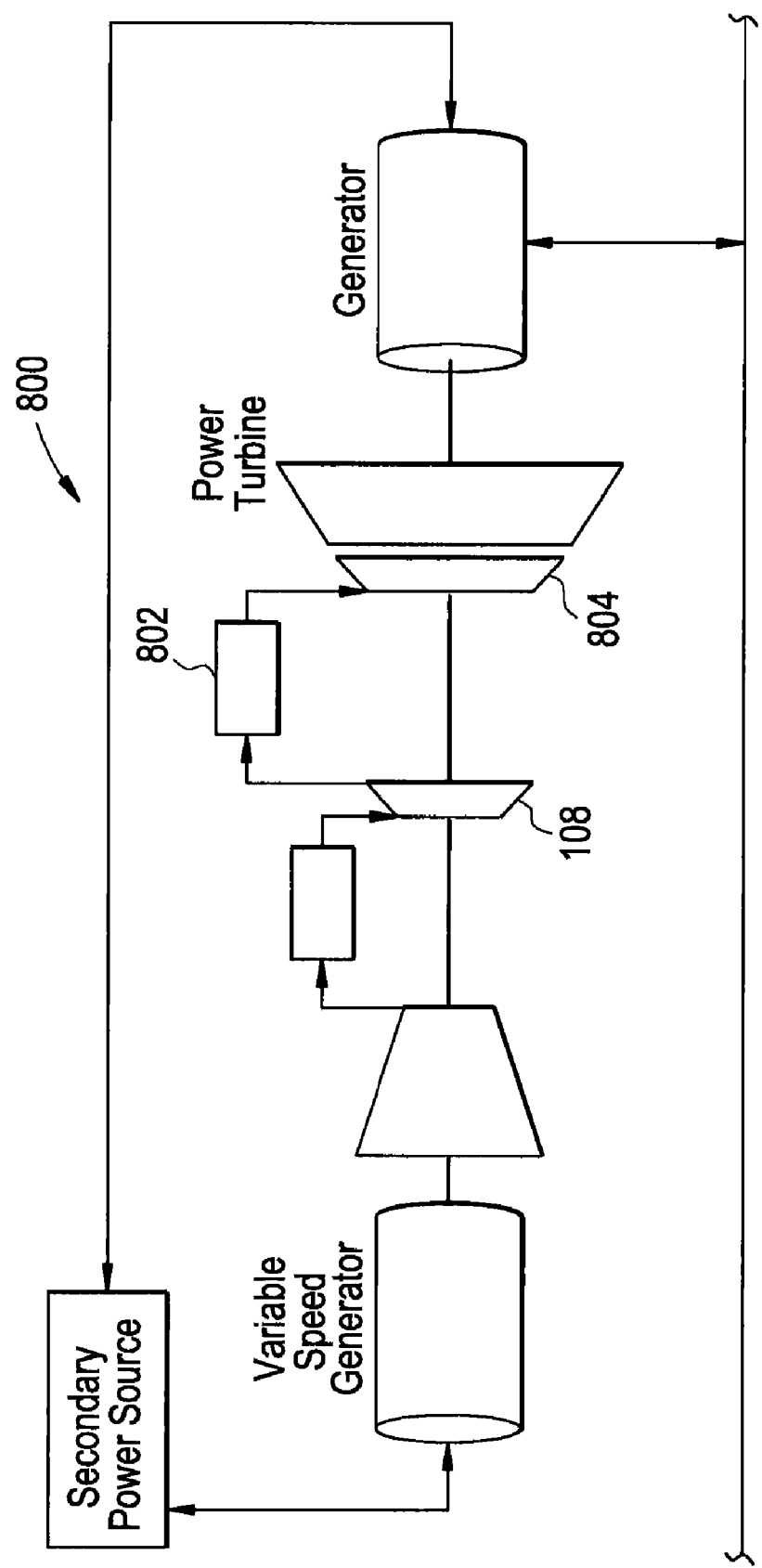
FIG. 8 is another alternate exemplary embodiment of the system of FIG. 1.

FIG. 8 illustrates yet another alternate exemplary embodiment of the system 100 that may be combined with any of the embodiments described above. In this regard, the system 800 includes a second combustor 802 that receives the output exhaust from the first high pressure turbine stage 108 and further heats the exhaust using combustion. The heated exhaust is output by the second combustor 802 to a second high pressure turbine stage 804 that is connected to the high pressure spool 108.

The embodiments described above offer systems and methods for multi-spool systems that offer advantages of single spool and multi-spool systems using variable speed generators.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
   a turbine engine having a high pressure spool mechanically connected to a compressor portion;
   a power turbine spool that is operative to be driven by exhaust emitted from the turbine engine;
   a first generator mechanically connected to the power turbine spool;
   a second generator mechanically connected to the high pressure spool;
   an outer shaft operative to connect the first generator to the power turbine spool; and
   an inner shaft disposed in a cavity in the outer shaft operative to connect the second generator to the high pressure spool.

2. The system of claim 1, wherein the first generator is a synchronous speed generator.

3. The system of claim 1, wherein the second generator is a variable speed generator.

4. The system of claim 1, wherein the system further comprises an electrical power source operative to drive the second generator.

5. The system of claim 1, wherein the first generator is connected to a steam turbine.

6. The system of claim 1, wherein the first generator is connected to a mechanical load.

7. The system of claim 1, wherein the system further comprises a combustor operative to heat exhaust emitted from the high pressure spool and output the heated exhaust to the power turbine.

8. The system of claim 1, wherein the system further comprises a combustor operative to heat exhaust emitted from a first stage of the high pressure spool and output the heated exhaust to a second stage of the high pressure spool.

9. The system of claim 1, wherein the system further comprises an electrical power source operative to drive the first generator.

10. The system of claim 1, wherein the first generator is a variable speed generator.

11. A system comprising:
a turbine engine having a high pressure spool connected to a compressor portion;
a power turbine spool operative to be driven by exhaust from the turbine engine;
a first generator connected to the power turbine spool;
a variable speed generator connected to the high pressure spool, operative to be driven by the high pressure spool;
an outer shaft operative to connect the first generator to the power turbine spool; and
an inner shaft disposed in a cavity in the outer shaft operative to connect the variable speed generator to the high pressure spool.

12. The system of claim 11, wherein the variable speed generator is further operative to drive the compressor portion in startup operation.

13. A system comprising:
a turbine engine having a high pressure spool mechanically connected to a compressor portion;
a power turbine spool that is operative to be driven by exhaust emitted from the turbine engine;
a first generator mechanically connected to the power turbine spool;
a second generator mechanically connected to the high pressure spool;
an outer shaft operative to connect the second generator to the high pressure spool; and
an inner shaft disposed in a cavity in the outer shaft operative to connect the first generator to the power turbine spool.

14. The system of claim 13, wherein the first generator is a synchronous speed generator.

15. The system of claim 13, wherein the second generator is a variable speed generator.

16. The system of claim 13, wherein the system further comprises an electrical power source operative to drive the second generator.

17. The system of claim 13, wherein the first generator is connected to a steam turbine.

18. The system of claim 13, wherein the first generator is connected to a mechanical load.

19. The system of claim 13, wherein the system further comprises a combustor operative to heat exhaust emitted from the high pressure spool and output the heated exhaust to the power turbine.

20. The system of claim 13, wherein the system further comprises a combustor operative to heat exhaust emitted from a first stage of the high pressure spool and output the heated exhaust to a second stage of the high pressure spool.

* * * * *